United States Patent [19]

Lombard

[11] 4,257,197
[45] Mar. 24, 1981

[54] HUB FOR MOUNTING A ROTARY TOOL
[75] Inventor: Gerard Lombard, Velaines, France
[73] Assignee: Essilor International "Cie Generale d'Optique", Cedex, France
[21] Appl. No.: 28,881
[22] Filed: Apr. 10, 1979
[30] Foreign Application Priority Data
Apr. 11, 1978 [FR] France ............................... 78 10628
[51] Int. Cl.³ .............................................. B24B 41/00
[52] U.S. Cl. ...................................... 51/168; 279/16; 409/234
[58] Field of Search .................. 51/168; 409/234, 231, 409/232, 236; 403/13, 14, 259; 279/1 W, 16; 85/36; 151/38; 279/1 D

[56] References Cited
U.S. PATENT DOCUMENTS
3,119,625  1/1964  Marr ..................................... 409/231
FOREIGN PATENT DOCUMENTS
1166945  6/1958  France .

Primary Examiner—Othell M. Simpson
Assistant Examiner—Roscoe V. Parker
Attorney, Agent, or Firm—Charles E. Brown

[57] ABSTRACT

A hub is disclosed for mounting the spindle of a rotary tool, particularly a grinding or polishing wheel for ophthalmic lenses. The hub comprises a cylindrical bore and a plurality of radial centering arms arranged around the bore with their free ends lying in a common circle concentric with the axis of the bore. The centering arms each have a hinge or pivot which may be formed by a portion of reduced section at their bases. The pivot or hinge axes of the centering arms are tangent to another common circle concentric with the bore. Each of the centering arms is of elastically deformable construction fixed, or formed in one piece, with the rest of the hub. The hub is divided by a radial groove into a rigid, one-piece part and a deformable flange formed by the centering arms. A tightening ring with a preferably planar thrust or engagement face is adapted to apply an axial force against the centering arms so that they come into retaining engagement with the spindle.

19 Claims, 5 Drawing Figures

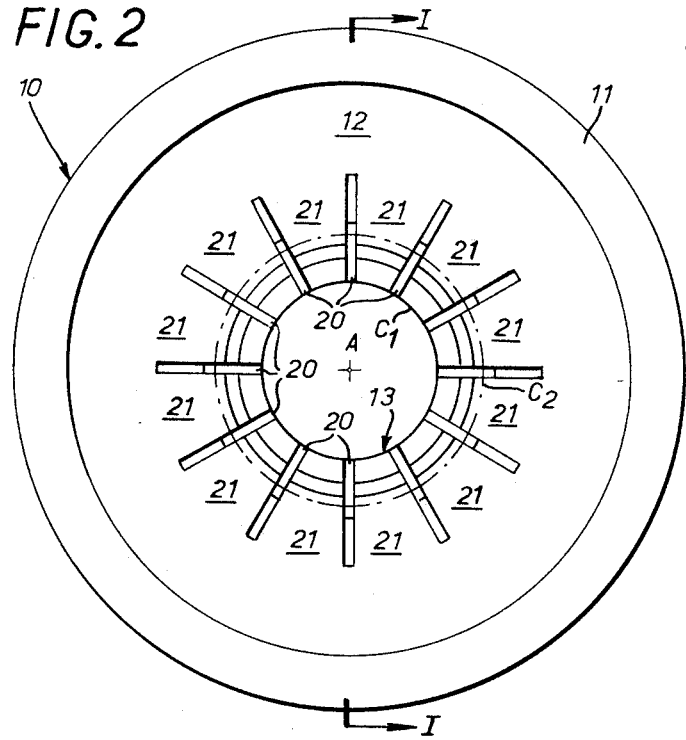
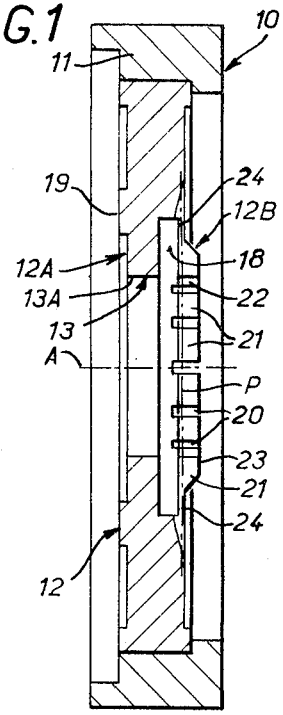
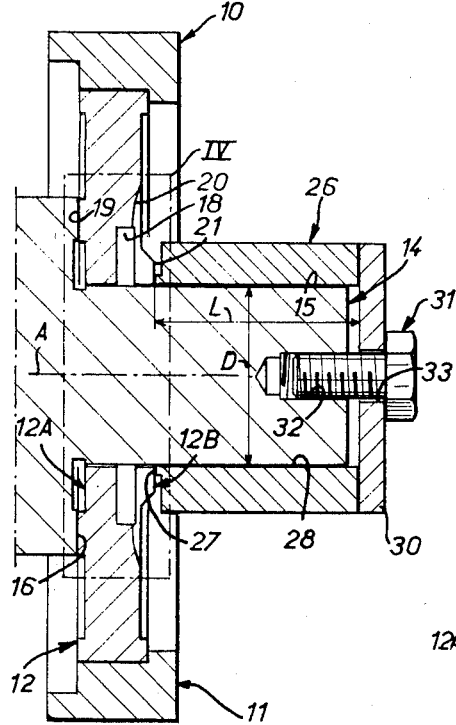
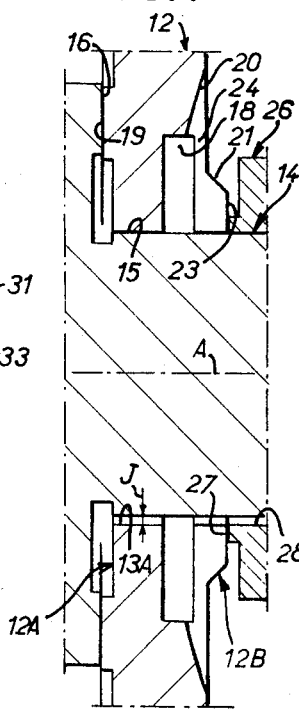
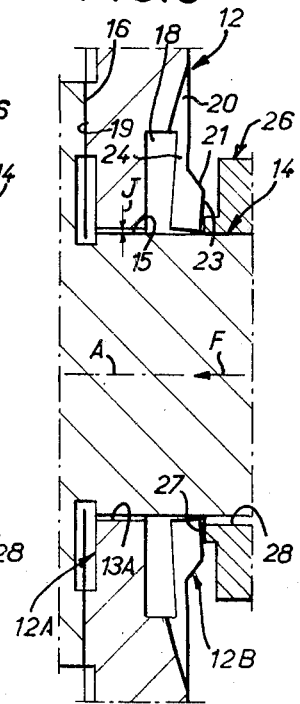

HUB FOR MOUNTING A ROTARY TOOL

The present invention relates generally to rotary tools and more particularly though not exclusively to grinding and polishing wheels of the type employed in precision grinding or polishing especially for ophthalmic lenses.

Such grinding or polishing wheels usually are provided with a central hub having a bore adapted to receive a rotatable supporting and driving spindle until it abuts against an axially protruding or transverse shoulder provided for that purpose. The complementary contact surfaces on the spindle and in the bore may be cylindrical or frustoconical.

As regards cylindrical fits the spindle and the bore in the hub are cylindrical. The problem is to assure accurate centering of the hub and therefore of the rotary tool carried by the hub in relation to the spindle, in other words, exact coincidence of the axis of the bore in the hub with the axis of the spindle.

The reason for this difficulty is the necessity of providing a certain clearance between the hub bore and the spindle to permit insertion of the spindle into the bore. In practice for a snug sliding fit this clearance is of the order of 20–30 microns. It is understood that this may lead to an eccentricity of 40–60 microns with respect to the spindle and therefore the tool carried by the hub may be at least 20 microns out of alignment.

The consequence is twofold. First the contact of the tool in the course of a revolution will be irregular which will be detrimental to the quality of the machining. Secondly the rotary tool will not wear uniformly. This nonuniform wear will result in a overall ovalization of the grinding or polishing wheel making it more difficult and costly to true and correct the grinding or polishing wheel after it has become worn and before it may be used again.

A frustoconical fit between hub bore and spindle theoritically provides accurate centering. However, it assumes the machining of identical male and female frustoconical bearing surfaces which in practice is not easy to faithfully perform from one machine to another.

Now the grinding wheel in question must be adapted to be mounted under identical conditions both on the spindle of the machine for which it is intended and on the spindle of the trueing machine, although with spindles having frustoconical bearing surfaces, the identity between such surfaces is uncertain.

Furthermore with a frustoconical fit there is a lack of axial precision in the locating of the grinding wheel on the spindle. Finally with such a frustoconical fit the dismantling of the grinding wheel, in other words its removal from the spindle, is often difficult.

A general object of the present invention is to provide an arrangement for enabling precision centering with a cylindrical fit.

According to the invention there is provided an improved hub for mounting a rotary tool, in particular a grinding or polishing wheel, of the type comprising a cylindrical bore adapted to receive a spindle, the hub being characterized by at least three centering arms extending generally radially relative to the bore and uniformly circularly spaced from one another around the bore, each of the arms having a free end lying on a common circle concentric with the bore, each of the centering arms being individually pivotally or hingedly mounted (for example by simple flexure), about an axis perpendicular to the axis of the bore and tangent to another common circle concentric with the bore.

In a preferred embodiment of simplified construction, the hub has a radial groove which separates the hub axially into two parts, a first rigid, one-piece part on one side of the groove and an elastically deformable flange part on the other side of the groove, the centering arms being elastically deformable and formed in one piece with the flange, radial slots being defined between consecutive arms.

In any event a tightening ring is associated with the hub and adapted to be received on the same cylindrical spindle as the hub for exerting an axial force on the centering arms.

When exerting such an axial force on the centering arms the centering arms pivot in unison about their respective pivotal axes thereby gradually reducing the diameter of the common circle along which their free ends lie, and therefore, the free ends engage the spindle received in the hub strictly centering the hub on the spindle.

At the same time the tightening ring which engages the elastically deformable part of the hub urges through the latter the rigid, one-piece part axially against bearing shoulder formed on the spindle on which the hub is mounted.

Hence the rigid, one-piece part of the hub essentially ensures, in a conventional manner, the securement of the hub for rotation on the spindle on which it is received whereas the elastically deformable part ensures the strict centering of the spindle.

In practice with such a hub the inevitable residual eccentricity is advantageously, under otherwise identical conditions, less than 5 microns and therefore the eccentricity of the hub in relation to the spindle on which it is received is advantageously less than 2.5 microns in this case. The resultant improvement in precision in centering is therefore appreciable.

These and other features and advantages of the invention will become apparent to the reader from the description which follows, given by way of example, with reference to the accompanying drawings, in which:

FIG. 1 is an axial cross sectional view of a grinding wheel equipped with a hub embodying the invention, taken on line I—I in FIG. 2;

FIG. 2 is a front elevational view of the grinding wheel;

FIG. 3 is a view similar to FIG. 1 after the grinding wheel is received on a cylindrical supporting and driving spindle and a tightening ring is put into place;

FIG. 4 is an enlarged fragmentary view of the inset IV in FIG. 3 before the tightening ring is in its tightening position; and FIG. 5 is a view similar to FIG. 4 with the tightening ring in its tightening position.

As is known per se, the grinding wheel 10 illustrated in FIGS. 1 and 2 comprises an annular peripheral grinding annulus or ring 11 force-fitted on a central support hub 12. The hub 12 has an axially cylindrical bore 13 adapted to be received on a spindle 14, FIG. 3, which spindle has, for this purpose, a cylindrical bearing surface 15 and an axially protruding transverse abutment shoulder 16 against which the hub is adapted to abut.

According to the preferred embodiment of the invention the hub 12 is divided in its central zone coaxially into two parts by a radial groove 18, namely, a rigid, one-piece part 12A to one side of groove 18 and an elastically deformable part 12B to the other side of the groove 18.

In the illustrated embodiment the parts 12A and 12B of the hub are in one piece with each other. The rigid, one-piece part 12A has on its transverse face remote from the elastically deformable part 12B a planar bearing surface 19 by which the hub 12 engages the transverse abutment shoulder 16 on the spindle 14. The rigid part 12A also comprises a bore 13A forming the major part of the bore 13 in the hub.

The elastically deformable part 12B generally forms a flange which is divided by radial slots 20 into a plurality of elastically deformable arms 21. In the illustrated embodiment there are twelve such elastically deformable arms 21 but as will appear hereinafter this number is obviously merely illustrative.

Preferably, as shown, the elastically deformable tongues 21 are uniformly angularly spaced from one another around the axis A of the bore 13 in the hub 12. Each elastically deformable arm 21 comprises an individually hinged or pivoted arm extending generally radially in relation to the bore 12; the free end 22 or each arm 21 lies along a common circle C1 concentric with the axis A of the bore.

In practice, and as shown, the free ends of the elastically deformable arms 21 together form a cylindrical bore 13B which is exactly in continuation of the cylindrical bore 13A in the rigid part 12A of the hub and which cooperates with the bore 13A to form the entire bore 13 through the hub 12.

Likewise, the transverse faces of the elastically deformable arms 12B opposite the rigid part 12A together form a forward thrust or engagement face 23 which is perpendicular to the axis A of the bore 13 and, in the illustrated embodiment, planar.

Each elastically deformable arm is individually attached to the flange by a base region 24 of lesser section which enhances its elasticity. The plane P through the middle of the base region which is represented by a chain-dotted line in FIG. 1 is common to all the elastically deformable arms 21.

At its base region 24 of reduced section each elastically deformable arm 21 is, so to speak, individually pivotally or hingedly mounted by simple flexure about an axis which is perpendicular to the axis A of bore 13 and tangent to a circle $C_2$ common to all the elastically deformable arms 21 and centered on axis A.

In the illustrated embodiment the elastically deformable arms 21 integrally formed with the hub 12 do not have a distinct or separate pivotal axis and consequently they are not shown or marked in the drawings. Only the corresponding circle $C_2$ is shown schematically by chain-dotted lines in FIG. 1. The pivot axis is merely theoretical in the illustrated embodiment.

Clearly, however, the pivot axis is located in the transverse plane P which is common to all the elastically deformable arms 21 passing through the median zone of the base region 24 of each arm.

In the illustrated embodiment the thrust or engagement face 23 defined by the elastically deformable arms 21 is axially offset relative to the transverse plane P.

A tightening ring 26 is associated with hub 12. The tightening ring 26 is adapted to be received on the same spindle 14 as the hub 12 for exerting a force on the elastically deformable arms 21. For this purpose the tightening ring 26 has on its side facing the elastically deformable arms 21 a forward engagement surface 27 perpendicular to the axis of the bore 28 which in the illustrated embodiment is planar.

Preferably, as shown, the axial length L of the tightening ring 26 is substantially equal to the diameter D of its bore 28.

With the tightening ring 26 are associated, in turn, a thrust plate 30 which is adapted to act on its transverse end opposite the forward engagement surface 27 and a screw 31 intended to be screwed into a threaded hole 32 in the spindle 12 after passing through the thrust plate 30 via passageway 33 formed axially therethrough.

As illustrated in FIG. 3 the grinding wheel 10 is axially received by bore 13 in hub 12 on spindle 14 until the transverse abutment shoulder 16 abuts thereagainst.

In order to facilitate the engagement for example with a snug sliding fit it is necessary to provide radial clearance between bore 13 in the hub 12 and the cylindrical bearing surface 15 of the spindle. In FIG. 4 the radial clearance is purposely exaggerated and designated by reference numeral J and because of the force of gravity it is shown to be the lower side of the hub 12.

The tightening ring 26 likewise defines the same clearance with the spindle 14.

But owing to the sufficient axial extent thereof, any attendant angling of the tightening ring relative to the axis of the assembly which occurs remains virtually without any effect on the perpendicularity of the forward engagement or thrust face 27 with respect to the axis whereby the tightening ring 26 is capable of acting in virtual certitude uniformly against the elastically deformable arms 21 of the hub 12.

During this action which is caused by turning the screw 21, as schematically illustrated by arrow F in FIG. 5, the elastically deformable arms 21 each pivot or flex about their respective pivot axes towards rigid part 12A of the hub 12.

Owing to the identical configuration of all the elastically deformable arms 21 they also pivot or flex uniformly.

Because of this pivoting movement the diameter of the circle $C_1$ on which lie the free ends of the elastically deformable arms becomes gradually smaller whereby the free ends of the arms engage the spindle 14 and bear uniformly thereagainst to ensure strict centering of the hub in relation to the spindle, the clearance between the elastically deformable arms and the spindle being uniform over the entire interface.

At the same time the tightening ring 26 urges, through the elastically deformable arms 21, the hub against the transverse bearing surface 16 on the spindle 14.

The invention is of course not limited to the described and illustrated embodiment but encompasses all modifications, alternatives and expedients, which will be apparent to one having ordinary skill in the art, without departing from the scope and spirit of the invention defined by the appended claims.

Thus, for instance, the flange which is divided into arms by radial slots and forms the elastically deformable part of the hub is not necessarily formed in one piece with the rigid part thereof. Rather, the flange may be a separate and distinct part suitably affixed to the rigid part 12A.

Moreover the centering arms are not necessarily formed as elastically deformable arms formed in one piece with a flange integrally formed with the hub with distinct pivot axes.

On the contrary the centering arms may be individually formed and suitable affixed to the hub about the bore therein.

In addition, as already mentioned above, the number of centering arms may be other than as indicated, three such arms being sufficient to ensure the sought-after centering.

Finally the axial length of the tightening ring 26 may be greater or less than the diameter of the tightening ring depending on the clearance between the bore in the hub and the spindle.

What is claimed is:

1. A hub for mounting a rotary tool, said hub comprising a cylindrical bore for receiving a spindle of a rotary tool wherein the spindle is of a preselected general diameter, said hub being characterized by at least three centering arms extending generally radially with respect to said bore and being uniformly angularly spaced therearound, free ends of said centering arms lying on a common circle concentric with the axis of said bore, each of said centering arms having hinge means for pivoting or flexing its respective centering arm about an axis perpendicular to the axis of said bore and tangent to another common circle concentric with said bore, said centering arms having a rest position in which the diameter of said common circle of said free end is at least as great as the diameter of said cylindrical bore and an operative position in which centering arms are pivoted or flexed so that said common circle is radially inwardly contracted to be smaller than said cylindrical bore so as to engage said centering arms with the preselected spindle and to hold the spindle in place in said hub.

2. The hub according to claim 1, wherein each of said centering arms is of elastically deformable construction formed in one piece with a relatively rigid flange fixed to said hub, and radial slots dividing said flange into said centering arms.

3. A hub for mounting a rotary tool, said hub comprising a cylindrical bore for receiving a spindle of a rotary tool, said hub being characterized by at least three centering arms extending generally radially with respect to said bore and being uniformly angularly spaced therearound, free ends of said centering arms lying on a common circle concentric with the axis of said bore, each said centering arm having hinge means for pivoting or flexing each said centering arm about an axis perpendicular to the axis of said bore and tangent to another common circle concentric with said bore, each of said centering arms being of elastically deformable construction formed in one piece with a flange fixed to said hub, radial slots dividing said flange into said centering arms, and a radial groove dividing said hub into two axially spaced integral parts including a relatively rigid part on one side of said radial groove and an elastically deformable part on the other side of said radial groove and forming said flange.

4. The hub according to claim 2 or 3, wherein each of said centering arms is joined to said flange by a base region of reduced section.

5. The hub according to claim 2 or 3, wherein the free ends of said centering arms together define a cylindrical bore which is a continuation of the aforesaid bore in said hub.

6. The hub according to claim 2 or 3, wherein said centering arms together define a forward thrust or engagement surface perpendicular to the axis of said bore.

7. The hub according to claim 6, said thrust or engagement surface being planar.

8. The hub according to claim 6, said forward thrust or engagement surface being axially offset relative to a plane containing said other common circle concentric with said bore.

9. The hub according to claim 2 or 3, said centering arms defined by said radial slots being formed in one piece with said hub.

10. The hub according to claim 3, together with a tightening ring adpated to be received on the spindle for exerting axial force against said centering arms.

11. The hub according to claim 10, wherein said tightening ring has a forward thrust or engagement face perpendicular to the axis of said bore.

12. The hub according to claim 11, with said forward thrust or engagement face being planar.

13. The hub according to claim 11, wherein the axial length of said tightening ring is substantially equal to the diameter of said bore.

14. The hub according to claim 11, wherein axial clearance is provided between the tightening ring and the spindle even when said centering arms are pivoted or flexed to their operative position by said tightening ring.

15. A hub for mounting a rotary tool, said hub comprising a cylindrical bore adapted to receive a spindle of a rotary tool, said hub being characterized by at least three centering arms extending generally radially with respect to said bore and being uniformly angularly spaced therearound, free ends of said centering arms lying on a common circle concentric with the axis of said bore, each of said centering arms having hinge means for pivoting or flexing of said centering arm about an axis perpendicular to the axis of said bore and tangent to another common circle concentric with said bore, and a tightening ring adapted to be received on the spindle for exerting axial force against said centering arms.

16. The hub according to claim 15, wherein said tightening ring has a forward thrust or engagement face perpendicular to the axis of said bore.

17. The hub according to claim 16, said forward thrust or engagement face being planar.

18. The hub according to claim 16 or 17, the axial length of said tightening ring is substantially equal to the diameter of said bore.

19. The hub according to claim 15, wherein each of said centering arms is of elastically deformable construction formed in one piece with a flange fixed to said hub and there being radial slots dividing said flange into said centering arms.

* * * * *